(12) United States Patent
Renius et al.

(10) Patent No.: US 7,954,198 B2
(45) Date of Patent: Jun. 7, 2011

(54) WINDSHIELD WIPER ASSEMBLY WITH UNITARY ARM AND POST

(75) Inventors: Paul W. Renius, Metamora, MI (US);
Sheryl Wolf, Royal Oak, MI (US);
David A. Pritchard, Tecumseh (CA)

(73) Assignee: GM Global Technology Operations LLC, Detroit, MI (US)

( * ) Notice: Subject to any disclaimer, the term of this patent is extended or adjusted under 35 U.S.C. 154(b) by 1062 days.

(21) Appl. No.: 11/746,663

(22) Filed: May 10, 2007

(65) Prior Publication Data
US 2008/0276401 A1    Nov. 13, 2008

(51) Int. Cl.
*B60S 1/16* (2006.01)
*B60S 1/34* (2006.01)

(52) U.S. Cl. ............... 15/250.34; 15/250.3; 15/250.31; 403/2

(58) Field of Classification Search ............... 15/250.34, 15/250.3, 250.31, 250.04; 403/2
See application file for complete search history.

(56) References Cited

U.S. PATENT DOCUMENTS

| | | | | |
|---|---|---|---|---|
| 1,506,132 A | * | 8/1924 | Oishei | 15/250.3 |
| 1,658,389 A | * | 2/1928 | Oishei | 15/250.3 |
| 1,695,342 A | * | 12/1928 | Oishei | 15/250.351 |
| 1,866,375 A | * | 7/1932 | Spinks | 15/250.32 |
| 2,925,617 A | * | 2/1960 | Williams | 15/250.04 |
| 5,070,572 A | * | 12/1991 | Kuhbauch | 15/250.13 |
| 6,568,023 B2 | * | 5/2003 | Perin et al. | 15/250.3 |

FOREIGN PATENT DOCUMENTS

| | | |
|---|---|---|
| CN | 1655974 A | 8/2005 |
| CN | 1914072 A | 2/2007 |
| DE | 10324277 A1 | 3/2003 |
| DE | 102005027533 A1 | 12/2006 |
| DE | 102005039110 A1 | 2/2007 |
| FR | 2763297 | * 11/1998 |

* cited by examiner

*Primary Examiner* — Gary K Graham
(74) *Attorney, Agent, or Firm* — Quinn Law Group, PLLC

(57) ABSTRACT

A windshield wiper assembly is provided having a unitary wiper arm and post, and a mechanical linkage for receiving the post and moving the arm. The post has a breakaway feature for breaking the post in response to impact. The wiper includes a head partially containing a center post and a button biased with a spring and connected to the center post for releasing the post from the linkage. The post and linkage include a captive ball and mating groove that are mutually engageable for securing the post to the linkage. Alternately, the post has a quick-connect end having a groove and the linkage has a receiving portion with a retractable collar and captive ball bearings. A vehicle is also provided including a windshield, a windshield wiper having a post, a wiper motor, and a mechanical linkage having an opening for receiving the post and powering the wiper.

15 Claims, 2 Drawing Sheets

WINDSHIELD WIPER ASSEMBLY WITH UNITARY ARM AND POST

TECHNICAL FIELD

The present invention relates to a windshield wiper assembly having a mechanical linkage and an integrated or unitary wiper arm and post, wherein the post portion of the unitary wiper arm and post is removably attached to a mating receptacle within the mechanical linkage to thereby enable rapid disconnection of the unitary arm and post as needed.

BACKGROUND OF THE INVENTION

Windshield wiper assemblies or windshield wipers are used almost universally on vehicle and aircraft windshields in order to improve operator and passenger visibility in wet or inclement weather. Windshield wipers usually include a wiper arm that is connected on one end to a vertical wiper post, and connected on the other end to an articulated section, which in turn connects to a blade section that is shaped or configured to retain a relatively soft rubber blade or sweep, which is the only portion of the wiper assembly that contacts the windshield surface. The wiper post is typically rigidly connected with a mechanical linkage which is connected to a motorized drive apparatus. The drive apparatus in turn powers or actuates the windshield wipers, thereby sweeping or "wiping" the water droplets, snow, ice, or other windshield surface obstructions from the field of view of the vehicle operator and other vehicle passengers. Modern windshield wipers are electrically controllable and typically include variable and/or intermittent speeds that are easily selectable by the operator as needed in order to conform with changing weather conditions.

The drive apparatus or system of a wiper assembly typically includes an electric wiper motor drivingly connected to a worm gear having a relatively high gear ratio. The gear ratio permits sufficient torque multiplication, which helps to reduce or minimize the size of wiper motor required to power the wiper assembly. The worm gear in turn is operatively connected to a mechanical linkage, which may include a series of levers, gears, and/or other connections, and which converts the rotation of the motor as imparted to the worm gear into a linear, alternating pattern of motion that propels or drives the wiper blades. A primary driving member of the wiper assembly, therefore, is commonly an alternately rotating vertical wiper post in driving connection with the wiper motor through the mechanical linkage, with the wiper post being a rigidly fixed portion over which a mating concavity of a wiper arm connects or fits.

When vehicle studies are directed toward the evaluation of a windshield wiper assembly, the removing a wiper arm from a wiper post while leaving the wiper post rigidly attached to the wiper drive assembly may under some circumstances provide a less than ideal condition for studying or evaluating the overall windshield wiper assembly or the vehicle without the wiper assembly. For example, if the wiper post of the wiper assembly remains rigidly attached to the vehicle via the wiper drive system after the wiper arm is detached or removed for study, the evaluation of a complete wiper assembly including the wiper posts may be less than optimal or may provide incomplete or inaccurate results. Additionally, it may be desirable to entirely remove or separate the wiper posts from immediate proximity to the windshield when performing certain impact evaluations and assessments, as the windshield and immediately surrounding area in proximity to the plenum often constitute or define a zone of study for certain windshield oriented evaluations. The ability to quickly remove or separate the wiper posts under these circumstances may therefore help to optimize or facilitate such studies.

SUMMARY OF THE INVENTION

Accordingly, a windshield wiper assembly is provided having a wiper arm continuously connected to or integral with a wiper post, and having a mechanical linkage adapted to receive and actuate the wiper post to thereby actuate the wiper arm, wherein the wiper post is readily detachable from the mechanical linkage as required in order to facilitate study of the wiper assembly.

In one aspect of the invention, the wiper post has a breakaway feature adapted to provide a weak point suitable for breaking of the wiper post in response to a suitably forceable impact with an object having a suitable mass.

In another aspect of the invention, a wiper head portion of the wiper arm at least partially contains the wiper post and has a depressible button and biasing spring, wherein the button is depressible for detaching the wiper post from the mechanical linkage, and wherein the biasing spring is operable for applying a return force to the button.

In another aspect of the invention, the wiper post includes one of a captive ball and mating recess, and the mechanical linkage includes the other of the captive ball and mating recess, with the captive ball and mating recess being mutually engageable for securing the wiper post to the mechanical linkage.

In another aspect of the invention, the wiper post includes a quick-connect end having a circumferential groove and the mechanical linkage has a receiving portion having a retractable collar and a series of captive ball bearings, wherein the quick connect end is insertable into the receiving portion when the collar is retracted, and wherein the groove is engageable with the series of captive ball bearings when the collar is released.

In another aspect of the invention, a vehicle is provided having a detachable windshield wiper assembly, the vehicle including a windshield, a windshield wiper having a wiper post, a windshield wiper motor, and a mechanical linkage having an opening adapted to receive the wiper post and operable for powering the windshield wiper, wherein the wiper post is insertable into the opening and detachable therefrom as needed.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
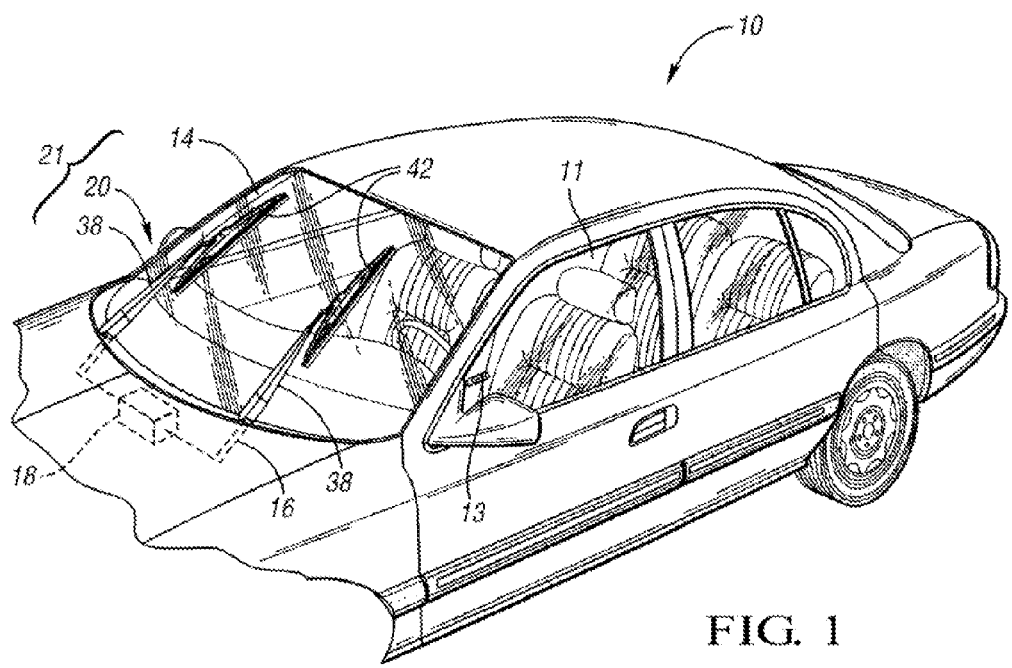
FIG. 1 is a perspective view of a vehicle having an wiper assembly according to the invention.

With reference to FIG. 1, wherein like reference numerals refer to like components, a vehicle 10 is shown having a passenger compartment 11, a windshield 14, and a windshield wiper assembly 21 operable for wiping, removing, or sweeping water, snow, or other visual obstructions from the field of view of an operator and/or passenger of the vehicle 10. The windshield wiper assembly 21 is shown having a preferred tandem arrangement, wherein the term "tandem" refers to a configuration of two unitary wipers 20 as described hereinbelow, however any number of unitary wipers 20 may be used on a given windshield 14 within the scope of the invention.

The windshield wiper assembly 21 includes a pair of unitary wipers 20 each having a wiper arm 38 and wiper blade 42, as described in more detail later hereinbelow. The unitary wipers 20 preferably are controllable and have a variable speed that is selectable by the vehicle operator (not shown), for example by using a selector switch or knob 13 conveniently positioned in an accessible location within the passenger compartment 11 of the vehicle 10. The windshield wiper assembly 21 further includes a power source or an electric motor 18, which is drivably and continuously connected with a mechanical linkage 16. The mechanical linkage 16 may include any number of interconnected cams, levers, shafts, rods, and/or other linkage mechanisms or components suitable for transferring rotational motion to the wiper arm 38, which is more fully described hereinbelow and in FIG. 2, to thereby move the connected windshield wiper blades 42 in a sweeping motion with respect to the windshield 14. As is understood by those of ordinary skill in the windshield wiper art, the electric motor 18 preferably drives or powers a worm gear (not shown), which in turn rotates a drive gear (not shown) that is in continuous driving connection with the mechanical linkage 16. In this manner, the rotation of the worm gear ultimately powers the wiper arm 38 in an alternating and sweeping manner with respect to the windshield 14.

Figure 2:
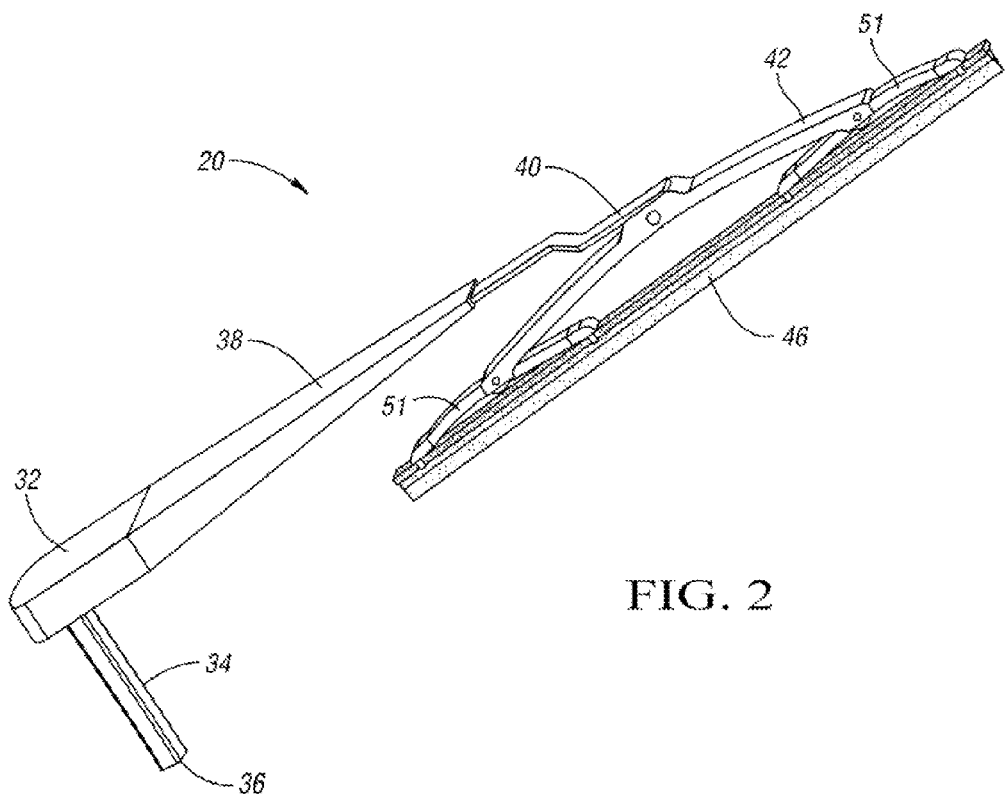
FIG. 2 is a front perspective view of a wiper assembly according to the invention.
Figure 3:
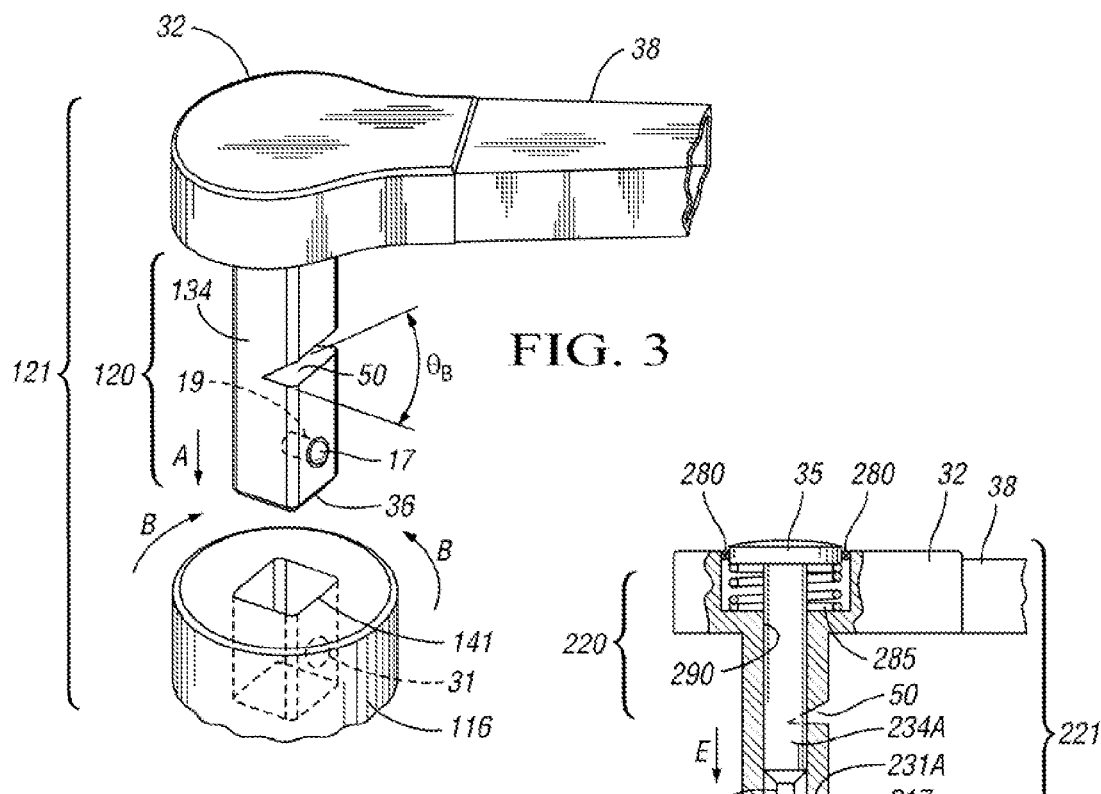
FIG. 3 is a fragmentary exploded view of a wiper assembly having a wiper post with a captive ball bearing and a mateable recess.
Figure 4:
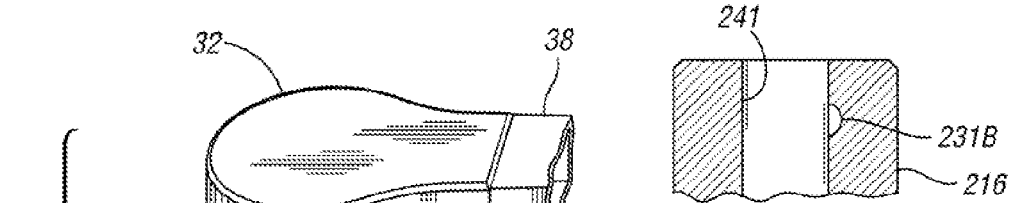
FIG. 4 is an exploded sectional view of an alternate wiper assembly of the invention having a depressible button in the wiper head suitable for inserting the wiper post into the mechanical linkage.
Figure 5:
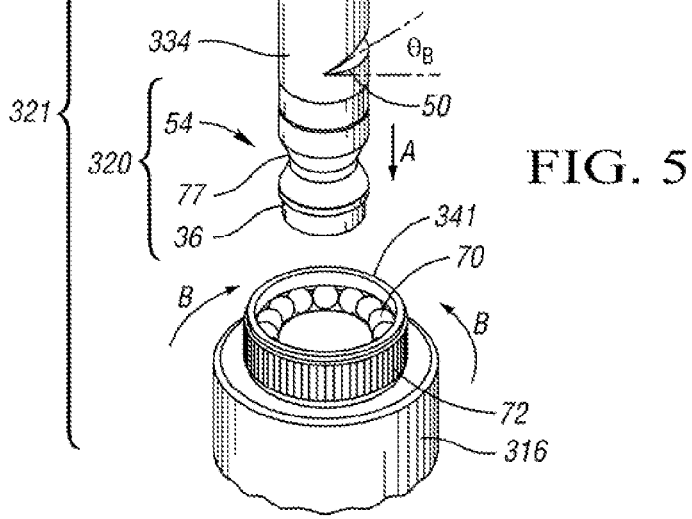
FIG. 5 is a fragmentary exploded perspective view of a wiper assembly of the invention having a wiper post with a quick-coupling end and a mechanical linkage having a mating recess.

Turning now to FIG. 2, a unitary wiper 20 of the invention is shown in more detail having a wiper head 32 and an integrated post portion or wiper post 34 having a post end 36. The term "unitary" as used herein refers to a one-piece or integrally formed wiper arm 38 and wiper post 34, with the wiper post 34 preferably rigidly connected to or formed integrally with a wiper head 32 portion disposed at one end of the wiper arm 38. The wiper post 34 and its various embodiments 134, 234, and 334, which are described later hereinbelow and shown in FIGS. 3, 4, and 5, are each preferably approximately 75 to 110 millimeters in length, although other lengths may be used as required within the scope of the invention. The post end 36 as shown in FIG. 2 is generic or featureless for the purpose of illustration of the other components of the unitary wiper 20, but includes the connection features described later hereinbelow and shown in FIGS. 3 and 4 within the scope of the invention.

As stated previously hereinabove, the wiper head 32 is preferably formed integrally with or rigidly connected to wiper arm 38 to form a portion or appendage thereof. The wiper arm 38 preferably includes an articulated portion or end 40 to which is attached a wiper blade 42. The wiper blade 42 preferably includes a pair of substantially horizontal cross pieces or support members 51 and a sweep portion or wiper rubber 46, with the wiper rubber 46 being the only portion of the wiper blade 42 in continuous contact with the windshield 14 (see FIG. 1). The wiper rubber 46 is preferably constructed of a weather-resistant grade of synthetic rubber or similar material, and is easily removed from the wiper blade 42 for replacement as needed. In accordance with the invention, the wiper head 32 is formed in one piece with the wiper post 34, or formed or constructed such that the wiper head 32 and wiper post 34 are rigidly connected to effectively form a unitary piece.

Turning now to FIG. 3, a first embodiment of the windshield wiper assembly 121 of the invention is shown having a preferably rectangular or square post 134 that is mateable or insertable into a similarly configured rectangular drive receptacle or opening 141 in the mechanical linkage 116. The mechanical linkage 116, shown generically as the mechanical linkage 16 in FIG. 1 and described hereinabove, is powered or actuated by the electric motor 18 such that alternate rotation of the mechanical linkage 116, as represented by arrows B, in turn rotates the square post 134 of the unitary wiper 120, thereby actuating the unitary wiper 120. The square post 134 includes a spring-loaded, captive ball bearing or ball detent 17 that is mateable with a bearing receptacle, cavity, or recess 31 in the mechanical linkage 116 as shown.

When the square post 134 is inserted into the drive opening 141, as represented by arrow A in FIG. 3, contact with the mechanical linkage 116 forces or pushes the ball detent 17 radially inward so that the ball detent 17 retracts or recedes into a hollow receptacle, cavity, or recess 19 formed within the square post 134, until such point as the ball detent 17 is substantially even with or positioned opposite the opposing recess 31 formed within the mechanical linkage 116. Once even with recess 31, a biasing mechanism such as a spring (not shown) that is positioned within the recess 19 provides a return force suitable for biasing the ball detent 17 such that the ball detent 17 releases into the recess 31 of the mechanical linkage 116. Once the ball detent 17 is released, the square post 134 is securely held or secured within the mechanical linkage 116 by the obstruction presented by the ball detent 17. The square post 134 remains in this position until sufficient tension force is exerted on the unitary wiper 120 to force the ball detent 17 to move axially inward or recede back into the recess 19, thereby enabling extraction or retraction of the square post 134 from the mechanical linkage 16.

The square post 134 further preferably includes a breakaway feature such as an angled notch, cut-out, or slot 50 forming an angle $\theta_B$ with respect to horizontal, with $\theta_B$ preferably being approximately 40 to 60 degrees. Slot 50 also preferably extends approximately halfway into the square post 134. In this manner, angle $\theta_B$ is configured to form a "breakaway" line on the square post 134, such that the unitary wiper 120 is allowed to separate or break away from the mechanical linkage 116 along slot 50 in the event of a sufficiently forceable contact or impact with the unitary wiper 120.

Turning to FIG. 4, a third embodiment of the windshield wiper assembly 221 is shown in cutaway side view having a unitary wiper 220 with an alternate square post 234 containing a moveable or deployable center post 234A. The center post 234A is positioned concentrically and coaxially within a recess 290 of the square post 234, and is operatively connected or formed with a depressible button 35 retained within the wiper head 32 of the wiper arm 38 using two or more retainers 280 sufficiently positioned around the periphery of the button 35. Button 35 is preferably constructed of similar or complementary material with that of the surrounding wiper head 32 in order to blend with the wiper head 32 in an aesthetically pleasing manner. Button 35 is also biased by a return spring 285 having a sufficient return force for returning the button 35 to its initial position once the button 35 is released or no longer depressed. The square post 234 is formed integrally with or otherwise rigidly attached to the wiper head 32 of the wiper arm 38 at one end, and has a captive ball bearing or ball detent 217 positioned within a cavity or recess 231A.

The mechanical linkage 216 likewise has a cavity or recess 231B suitable for receiving or engaging the ball detent 217 of square post 234. When the center post 234A is inserted into opening 241 of the mechanical linkage 216, the button 35 is depressed in the direction of arrow E, and the ball detent 217 freely moves a short distance radially inward into a cavity 231C within the center post 234A. The cavity 231C is sufficiently shaped or formed so as to restrict the ball detent 217 from moving entirely into the center post 234A, allowing only sufficient lateral movement to permit the ball detent 217 to disengage with the recess 231B of the mechanical linkage 216. In other words, so long as the button 35 is fully depressed, the unitary wiper 220 may be freely inserted or extracted from the mechanical linkage 216.

When the button 35 is released, the spring force provided by biasing spring 285 moves the center rod 234A upward until the button 35 reaches its initial, un-depressed position. The center rod 234A preferably has a lower portion 36B defined by the portion of the center rod 234A positioned axially below the cavity 231C and sufficiently formed or shaped to push or move the ball detent 217 radially outward toward and into locking engagement with the mating recess 231B in the mechanical linkage 216.

The square post 234 preferably also includes a slot 50 as previously described hereinabove, and which is configured to form a "breakaway" line along the square post 234 and center post 234A, such that the unitary wiper 220 is allowed to separate or break away from the mechanical linkage 216 along slot 50 in the event of forceable contact of an object with the unitary wiper 220.

Turning now to FIG. 5, a fourth embodiment of the windshield wiper assembly 321 of the invention is shown having a preferably circular post 334 that is mateable or insertable into a similarly circular opening 341 in a portion of an alternate mechanical linkage 316. The mechanical linkage 316, like the mechanical linkage 16 represented in FIG. 1 and described hereinabove, is drivably connected with the electric motor 18 so that alternate rotation of the mechanical linkage 316, as represented by arrows B, also rotates the circular post 334, thereby actuating the unitary wiper 320.

The post end 36 of circular post 334 is a quick-coupling end 54 which has a circumferential groove 77 that is engageable or matable with a series of captive ball bearings 70 positioned within the mechanical linkage 316. A retractable sleeve 72 is operatively connected to the mechanical linkage 316 such that when the sleeve 72 is retracted in a direction away from the circular post 334, i.e. in the direction of arrow A, the ball bearings 70 move freely in a radially outward direction in response to contact with the circular post 334, thereby allowing the circular post 334 to be inserted into opening 141. Likewise, retraction of the retractable sleeve 72 is accomplished by pushing downward on the sleeve 72 in the direction of arrow A while simultaneously pulling or extracting the unitary wiper 320 from the mechanical linkage 316. Once the quick-coupling end 54 is fully inserted into the opening 341, the ball bearings 70 settle into the circumferential groove 77 of the quick-coupling end 54, and the sleeve 72 is then released. The end 36 of unitary wiper 320 and the mechanical linkage 316 are configured to provide a rotational interfit, such as a splined connection (not shown), that is suitable for locking the unitary wiper 320 to the mechanical linkage 316, thereby ensuring the alternate rotation of the mechanical linkage 316 (represented by the arrows B) in turn rotates the unitary wiper 320.

When the sleeve 72 is released, the ball bearings 70 are physically blocked or restricted from moving radially outward with respect to the sleeve 72, thus securing the circular post 334 to the mechanical linkage 316. To release the circular post 334 from the mechanical linkage 316, the reverse operation is performed, with the retractable sleeve 72 once again retracted in the direction of arrow C, which allows the circular post 334 to be extracted from the opening 341 of the mechanical linkage 316.

While the preferred embodiment places the quick-coupling end 54 on the circular post 334 and the sleeve 72 on the mechanical linkage 316, those of ordinary skill in the art will recognize that the opposite connection may also be included within the scope of the invention. Additionally, it is understood that various other quick-coupling industrial fittings and/or other quick-connection options are available for connecting the post 34 of FIG. 1 and its alternate embodiments 134 and 234 shown in FIGS. 3 and 4, to the mechanical linkage 16 and its alternate embodiments 116 and 216 shown in FIGS. 3 and 4, within the scope of the invention.

Additionally, the circular post 334 preferably also includes slot 50 as previously described hereinabove, and which is configured to form a "breakaway" line along the circular post 334, such that the unitary wiper 320 is allowed to separate or break away from the mechanical linkage 316 along slot 50 in the event of forceable contact of an object with the unitary wiper 320.

While the best modes for carrying out the invention have been described in detail, those familiar with the art to which this invention relates will recognize various alternative designs and embodiments for practicing the invention within the scope of the appended claims.

The invention claimed is:

1. A windshield wiper assembly comprising:
   a wiper arm and a wiper post forming a unitary piece; and
   a mechanical linkage which receives and actuates said wiper post to move said wiper arm;
   wherein the wiper post:
      is selectively detachable from the mechanical linkage; and
      has a breakaway feature forming a weak point in the wiper post that is sufficient for breaking the wiper post in response to a sufficiently forceable impact with an object having a suitable mass.

2. The windshield wiper assembly of claim 1, including a wiper head that is integrally formed with said wiper arm, wherein said wiper head, said wiper arm, and said wiper post form the unitary piece.

3. The windshield wiper assembly of claim 1, wherein one of said wiper post and said mechanical linkage includes at least one captive ball, and wherein the other of said wiper post and said mechanical linkage includes one of a mating circumferential groove and a mating recess, said at least one captive ball and said mating circumferential groove or said mating recess being mutually engageable for securing said wiper post to said mechanical linkage.

4. The windshield wiper assembly of claim 3, wherein:
   said wiper post includes a quick-coupling end having the circumferential groove;

said mechanical linkage has a receiving portion with a series of captive ball bearings as the at least one captive ball, and a retractable collar;

said quick-coupling end is insertable into said receiving portion when said retractable collar is retracted; and said circumferential groove is engageable with said ball bearings when said retractable collar is released.

5. The windshield wiper assembly of claim 1, wherein said wiper post is approximately 75 to 110 millimeters in length.

6. A windshield wiper assembly for use with a vehicle having a windshield, the assembly comprising:

an electric motor;

a unitary wiper having an integrated wiper arm portion and post portion, and a wiper blade operatively connected to said wiper arm portion and configured to hold a rubber windshield wiper sweep; and a mechanical linkage having a receptacle that is mateable with said post portion and driven by said electric motor to thereby actuate said unitary wiper for wiping of the windshield;

wherein said post portion is insertable into said mechanical linkage and selectively detachable therefrom as needed, and includes a breakaway feature providing a weak point sufficient for breaking the post portion in response to a sufficiently forceable impact with an object.

7. The assembly of claim 6, wherein said breakaway feature is a slot extending approximately halfway into said post portion and formed at an angle of between approximately 40 to 60 degrees relative to horizontal.

8. The assembly of claim 6, wherein one of said post portion and said mechanical linkage includes at least one captive ball mating and wherein the other of said post portion and said mechanical linkage includes one of a mating circumferential groove and a mating recess, said at least one captive ball and said mating groove or mating recess being mutually engageable for securing said post portion to said mechanical linkage.

9. The assembly of claim 8, wherein:

said post portion includes a quick-coupling end having the circumferential groove;

said mechanical linkage has a receiving portion with a series of captive ball bearings as the at least one captive ball, and a retractable collar;

said quick-coupling end is insertable into said receiving portion when said retractable collar is retracted; and said circumferential groove is engageable with said ball bearings when said retractable collar is released.

10. The assembly of claim 6, wherein said post portion is approximately 75 to 110 millimeters in length.

11. A vehicle comprising:

a windshield;

a unitary windshield wiper operable for cleaning said windshield, said unitary windshield wiper having a wiper arm and a wiper post, wherein the wiper post has a breakaway feature providing a weak point in the wiper post sufficient for breaking the wiper post in response to a sufficiently forceable impact with an object having a suitable mass;

a windshield wiper motor configured to actuate said unitary windshield wiper; and a mechanical linkage having an opening configured to receive said wiper post;

wherein said wiper arm and wiper post are formed in one piece, and wherein said wiper post is insertable into said opening and detachable therefrom as needed.

12. The vehicle of claim 11, wherein said breakaway feature is a slot extending approximately halfway into said post and formed at an angle of between approximately 40 to 60 degrees relative to horizontal.

13. The vehicle of claim 11, wherein one of said wiper post and said mechanical linkage includes at least one captive ball, and wherein the other of said post portion and said mechanical linkage includes one of a mating circumferential groove and a mating recess, said at least one captive ball and said mating groove or mating recess being mutually engageable for securing said wiper post to said mechanical linkage.

14. The vehicle of claim 13, wherein:

said wiper post includes a quick-coupling end having the circumferential groove;

said mechanical linkage has a receiving portion with a series of captive ball bearings as the at least one captive ball, and a retractable collar;

said quick-coupling end is insertable into said receiving portion when said retractable collar is retracted; and said circumferential groove is engageable with said ball bearings when said retractable collar is released.

15. The vehicle of claim 11, wherein said wiper post is approximately 75 to 110 millimeters in length.

* * * * *